United States Patent
Doi et al.

(10) Patent No.: US 9,098,250 B2
(45) Date of Patent: Aug. 4, 2015

(54) COMPUTER ASSEMBLY INCORPORATING COUPLING WITHIN PANTOGRAPH

(71) Applicant: LENOVO (SINGAPORE) PTE, LTD, New Tech Park (SG)

(72) Inventors: Toshihisa Doi, Kanagawa-Ken (JP); Satoshi Hosoya, Kanagawa-Ken (JP)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 168 days.

(21) Appl. No.: 13/944,794

(22) Filed: Jul. 17, 2013

(65) Prior Publication Data

US 2015/0022960 A1    Jan. 22, 2015

(51) Int. Cl.
G06F 1/16 (2006.01)
G06F 1/18 (2006.01)

(52) U.S. Cl.
CPC ..................................... *G06F 1/18* (2013.01)

(58) Field of Classification Search
CPC ................................... G06F 1/18; H05K 5/02
USPC ................. 361/600–678, 679.46–679.54, 361/688–727, 679.01–679.45, 361/679.55–679.61; 400/472, 491.2, 492, 400/479; 200/521, 344, 345, 517, 329, 293, 200/512

See application file for complete search history.

(56) References Cited

U.S. PATENT DOCUMENTS

| | | | | |
|---|---|---|---|---|
| 4,560,845 A * | 12/1985 | Takamura et al. | ............ | 200/5 A |
| 4,772,769 A * | 9/1988 | Shumate | ........................ | 200/314 |
| 5,280,147 A * | 1/1994 | Mochizuki et al. | ........... | 200/344 |
| 5,457,453 A * | 10/1995 | Chiu et al. | ........................ | 341/22 |
| 5,488,210 A * | 1/1996 | Shigetaka et al. | ............. | 200/344 |
| 5,659,307 A * | 8/1997 | Karidis et al. | ................... | 341/22 |
| 5,684,279 A * | 11/1997 | Burgett | ........................... | 200/5 A |
| 5,697,718 A * | 12/1997 | Erler et al. | ..................... | 400/714 |
| 5,772,008 A * | 6/1998 | Yu et al. | ......................... | 200/344 |
| 5,951,178 A * | 9/1999 | Lim | ................................. | 400/472 |
| 6,087,604 A | 7/2000 | Suga et al. | | |
| 6,225,586 B1 * | 5/2001 | Watanabe et al. | ............. | 200/344 |
| 6,236,003 B1 * | 5/2001 | Suganami | ...................... | 200/5 A |
| 6,366,275 B1 * | 4/2002 | Lai | ................................. | 345/168 |
| 6,536,966 B1 * | 3/2003 | Butler | ............................ | 400/492 |
| 6,560,119 B1 * | 5/2003 | Katsuyama et al. | ........... | 361/752 |
| 6,590,565 B2 * | 7/2003 | Hosoya | ........................ | 345/168 |
| 6,682,235 B2 * | 1/2004 | Monney et al. | ............... | 400/472 |
| 6,781,077 B2 * | 8/2004 | Olodort et al. | ................ | 200/344 |
| 6,903,924 B1 * | 6/2005 | Tyner | ........................ | 361/679.08 |
| 7,608,792 B1 * | 10/2009 | Tsai | ............................... | 200/310 |
| 7,847,204 B2 * | 12/2010 | Tsai | ............................... | 200/314 |
| 7,850,378 B1 * | 12/2010 | Ligtenberg et al. | ........... | 400/490 |
| 8,035,051 B2 * | 10/2011 | Yanagida | ........................ | 200/343 |
| 8,102,081 B2 * | 1/2012 | Imamura | .................. | 307/132 EA |
| 8,672,601 B2 * | 3/2014 | Nitsche | ........................... | 411/510 |
| 8,693,176 B2 * | 4/2014 | Morino | ..................... | 361/679.08 |

(Continued)

*Primary Examiner* — Courtney Smith
*Assistant Examiner* — Rashen E Morrison
(74) *Attorney, Agent, or Firm* — Shimokaji IP

(57) ABSTRACT

A computer system with an input assembly may include a fastener positioned through a bottom chassis and into a pre-existing opening of a pantograph. In a keyboard assembly, the fastener may couple to a boss axially aligned with the pantograph housed at least partially within a keyboard key. In a touchpad assembly, the fastener may couple to a boss axially aligned with the pantograph housed underneath a tactile sensing layer. The fastener may occupy the space in the pantograph without making contact with the key or tactile sensing layer as the key or tactile sensing layer is depressed.

10 Claims, 4 Drawing Sheets

(56) References Cited

U.S. PATENT DOCUMENTS

| | | | |
|---|---|---|---|
| 8,922,982 B1* | 12/2014 | Chen | 361/679.17 |
| 2003/0179540 A1* | 9/2003 | Suda | 361/680 |
| 2007/0251810 A1* | 11/2007 | Corcoran et al. | 200/507 |
| 2008/0121508 A1* | 5/2008 | Chuang | 200/344 |
| 2008/0264770 A1* | 10/2008 | Purcocks | 200/521 |
| 2009/0133999 A1* | 5/2009 | Yamada et al. | 200/345 |
| 2010/0300772 A1* | 12/2010 | Lee et al. | 178/18.06 |
| 2011/0067990 A1* | 3/2011 | Ligtenberg et al. | 200/5 A |
| 2011/0220479 A1* | 9/2011 | Zhou | 200/5 A |
| 2011/0290628 A1* | 12/2011 | Tsai | 200/5 A |
| 2011/0297523 A1* | 12/2011 | Tsai | 200/5 A |
| 2012/0048700 A1* | 3/2012 | Liu | 200/5 A |
| 2012/0224315 A1* | 9/2012 | Mizoguchi et al. | 361/679.09 |
| 2013/0220786 A1* | 8/2013 | Niu | 200/344 |
| 2013/0313094 A1* | 11/2013 | Shen et al. | 200/5 A |
| 2013/0328785 A1* | 12/2013 | Brooks et al. | 345/170 |
| 2013/0334018 A1* | 12/2013 | Hsu | 200/341 |
| 2014/0014488 A1* | 1/2014 | Tsai | 200/5 A |
| 2014/0054154 A1* | 2/2014 | Hsu | 200/512 |
| 2014/0090966 A1* | 4/2014 | Yu et al. | 200/5 A |
| 2014/0110231 A1* | 4/2014 | Kibiti et al. | 200/293 |
| 2014/0300551 A1* | 10/2014 | Purcocks | 345/168 |

* cited by examiner

COMPUTER ASSEMBLY INCORPORATING COUPLING WITHIN PANTOGRAPH

BACKGROUND OF THE INVENTION

The present invention relates generally to computer assemblies and more particularly, to a computer assembly incorporating a coupling within a pantograph.

Conventional computer input systems, for example keyboard assemblies, may be typically assembled by screwing a bottom half of the assembly to the top half of the assembly via screws mounted around the perimeter of the assembly avoiding contact with input components. In some cases, screws may also couple the two halves at interior points of the assembly, for example, in spaces between key positions so as not to interfere with the position and operation of the keys. However, conventional screw placement on input assemblies may be spaced relatively far apart. The distance between coupling points may cause flexure of unsupported portions of the keyboard during pressing of the keys. The flexure may be uncomfortable and noticeable for the user as they spend extended periods typing and clicking on the input assembly.

Therefore, it can be seen that there is a need for mounting screws into an input assembly that provides better support to avoid flexure while minimizing the assembly's profile.

SUMMARY

In one aspect, a computer input assembly is provided. The computer input assembly comprises a top chassis. A depressible input mechanism may be interfacing the top chassis. A pantograph may be disposed between the input mechanism and a bottom chassis. The pantograph may include a pair of scissor arms and an opening between the scissor arms. A boss may be accessible through the bottom chassis and axially aligned to the opening between the scissor arms of the pantograph. The boss may be configured to receive a fastener to fasten the bottom chassis to the boss.

In another aspect, a touchpad assembly is provided. The touchpad assembly comprises, a tactile sensing layer, a depressible input mechanism coupled to the tactile sensing layer, and a bottom chassis disposed below the tactile sensing layer and the depressible input mechanism. A pantograph may be disposed between the input mechanism and the bottom chassis. The pantograph may include a pair of scissor arms and an opening between the scissor arms. A boss may be accessible through the bottom chassis and axially aligned to the opening between the scissor arms of the pantograph. The boss may be configured to receive a fastener to fasten the bottom chassis to the boss.

In a further aspect, a keyboard assembly is provided. The keyboard assembly comprises a top chassis; a bottom chassis; a keyboard exposed through the top chassis; a touchpad exposed through the top chassis; at least one pantograph disposed between either a key of the keyboard and the bottom chassis or the touchpad and the bottom chassis, the pantograph including a pair of scissor arms and an opening between the scissor arms; and a boss accessible through the bottom chassis and axially aligned to the opening between the scissor arms of the pantograph, the boss configured to receive a fastener into the opening between the scissor arms to fasten the bottom chassis to the boss.

These and other features, aspects and advantages of the present invention will become better understood with reference to the following drawings, description and claims.

DETAILED DESCRIPTION OF EMBODIMENTS

The following detailed description is of the best currently contemplated modes of carrying out exemplary embodiments. The description is not to be taken in a limiting sense, but is made merely for the purpose of illustrating the general principles, since the scope of the embodiments is best defined by the appended claims.

Various inventive features are described below that can each be used independently of one another or in combination with other features.

Broadly, exemplary embodiments provide a coupling mechanism within a pantograph that may provide support to alleviate flexure in a keyboard assembly. The coupling mechanism may use existing empty space to house a fastener thus avoiding the need to dedicate keyboard assembly space specifically to accommodate the anchoring of a fastener. In exemplary embodiments, a keyboard assembly may use one or more pantographs and the fastener may couple the keyboard chassis into place by securing the fastener into a boss axially aligned to the existing central opening of the pantograph.

Figure 1:
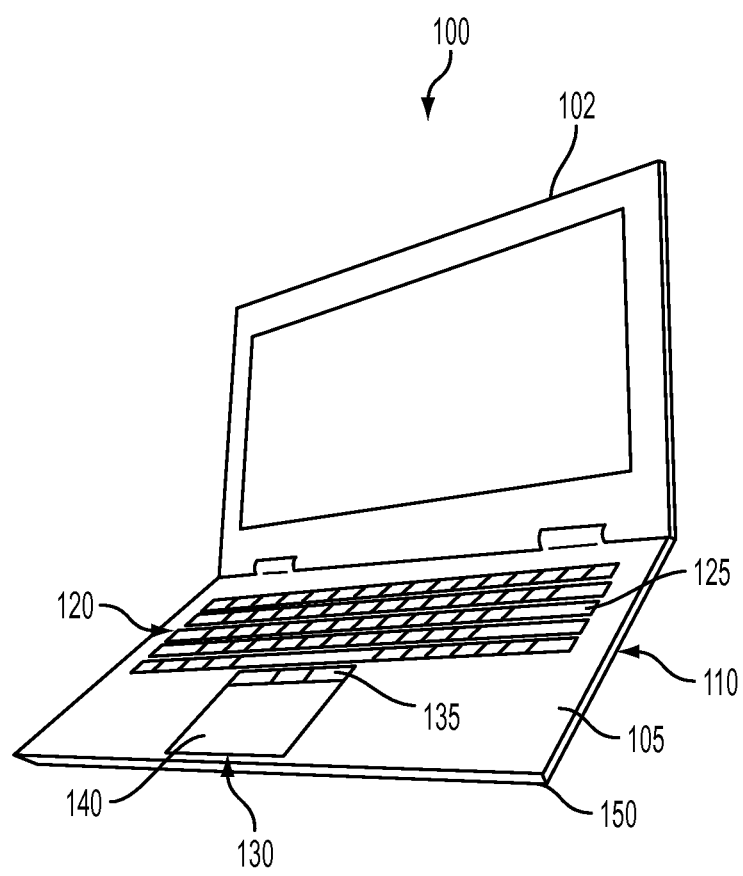
FIG. 1 is a perspective view of computer system in accordance with an exemplary embodiment of the present invention.

Referring now to the Figures, FIG. 1 shows a computer system 100 which may include a display 102 and a computer input assembly 110. While the computer system 100 is shown as a laptop device, it will be understood that other computing devices incorporating an input assembly 110 may be used. The input assembly 110 may include in general an input mechanism, for example, a keyboard assembly 120 with a plurality of keys 125 and/or a touchpad assembly 130, which may include a tactile sensing layer 140 and one or more buttons 135 disposed adjacent the tactile sensing layer and exposed for contact by a user. The computer input assembly 110 may be housed between a top chassis 105 and bottom chassis 150. The keys 125 and the tactile sensing layer 140 may be exposed through the top chassis 105 to provide user contact. In exemplary embodiments, one or more of the keys 125 and/or one or more features of the touchpad assembly 130 may be depressible as described in further detail below.

Figure 2A:
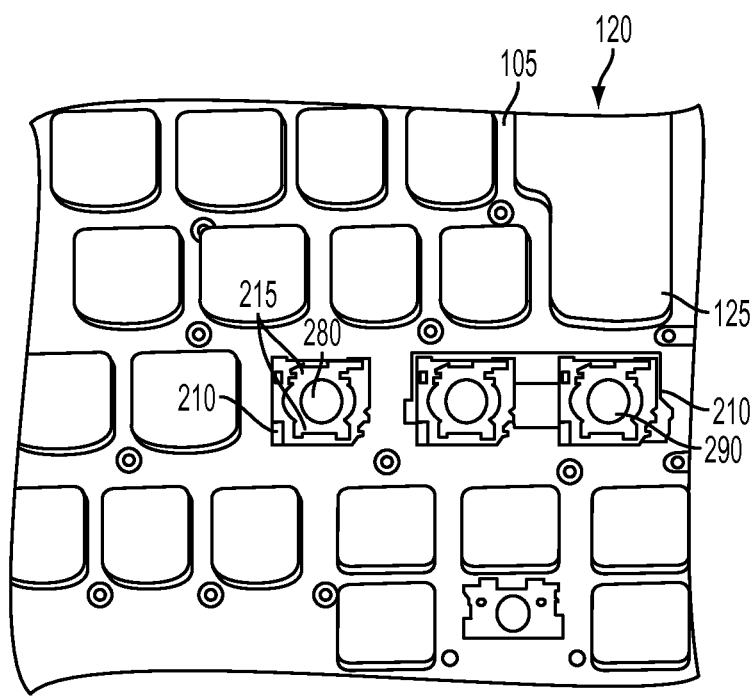
FIG. 2A is a partial top view of a keyboard assembly of FIG. 1 showing pantographs exposed by the removal of keys.

Referring now to FIG. 2A, the keyboard assembly 210 is shown with keys 125 in typical attachment to the chassis 105 and keys 125 removed from the chassis 105 exposing a pantograph 210 underneath. Under some keys 125 a single pantograph 210 may be present while some other keys 125, for example, the spacebar, the "Shift" key, the "Enter" key, or the "Backspace" key may house two pantographs 210. The pantograph 210 may include a pair of spring-type scissor arms 215 with a central opening 280 between the scissors arms 215. Some of the exemplary pantographs 210 may have fully exposed openings 280 while some exemplary pantographs 210 may include a rubber dome 290 covering the opening 280.

Figure 2B:
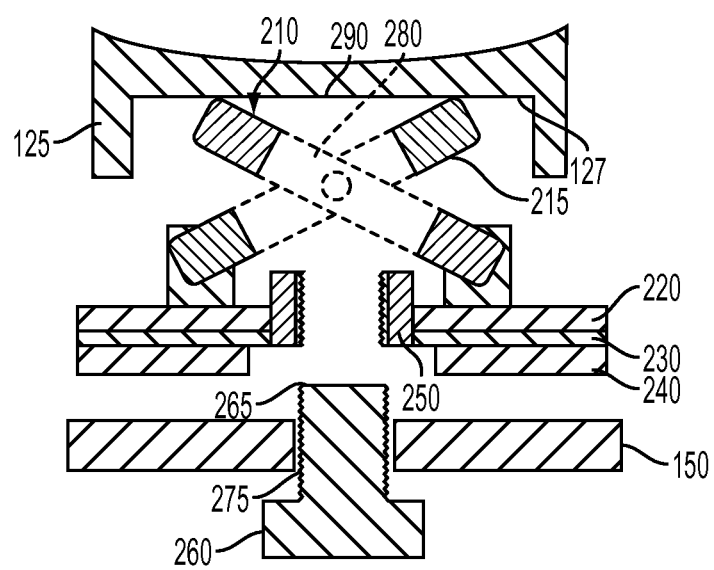
FIG. 2B is an enlarged cross-sectional partially exploded side view of a keyboard key housing a pantograph and fastener as may be used in FIG. 2A in accordance with an exemplary embodiment of the present invention.

Referring now to FIG. 2B, in an exemplary embodiment, a key 125 housing a pantograph 210 and a boss 250 axially aligned with the opening 280 is shown. The boss 250 may project through a light guide 240, a base plate 230, and an electrical layer 220. The electrical layer 220 may provide a signal output to other devices indicating that the pantograph 210 is depressed in response to contact by the scissor arms 215. A hole 275 in the bottom chassis 150 may provide access to the boss 250 for receipt of a fastener 260. In some embodiments, the fastener 260 may be a screw and the boss 250 may be threaded. When the fastener 260 couples the bottom chassis 150 to the boss 250, a top end 265 of the fastener 260 may fit within the opening 280 with sufficient clearance to a bottom side 127 of the key 125 as the key 125 is depressed onto the pantograph 210. As may be appreciated, the fastener 260 may efficiently use previously existing open space while providing a support point underneath the key 125.

Figure 3:
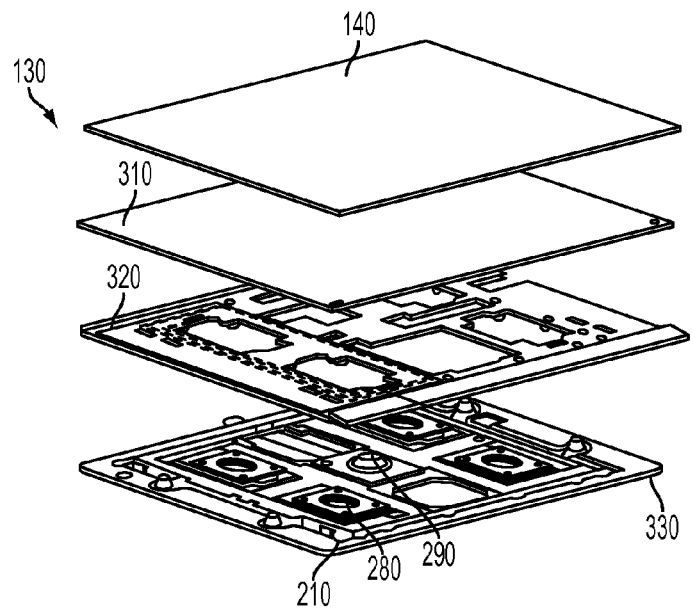
FIG. 3 is an exploded perspective view of a touchpad assembly used in the computer system of FIG. 1.
Figure 4:
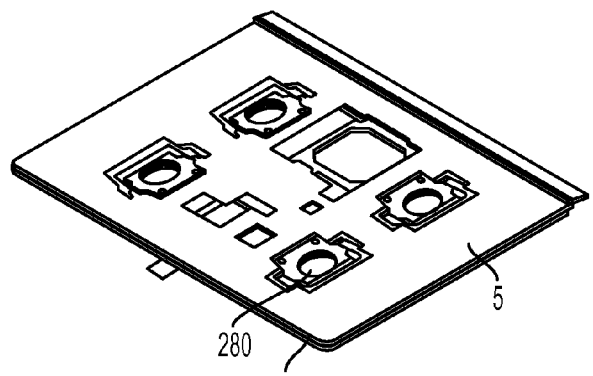
FIG. 4 is a perspective view of the touchpad assembly of FIG. 3 with a tactile sensor layer removed.
Figure 5:
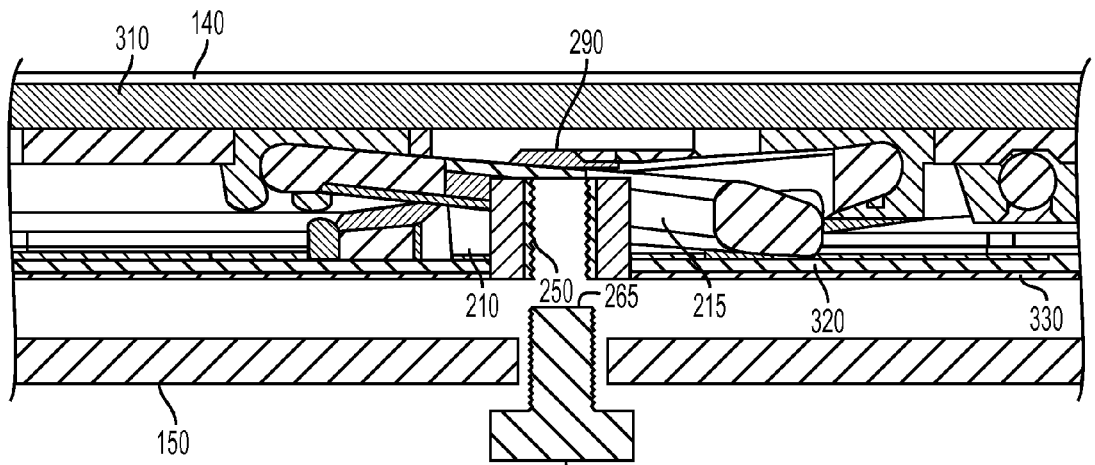
FIG. 5 is an enlarged, partial, cross-sectional side view of the touchpad assembly shown within circle 5 of FIG. 4 incorporating coupling within a pantograph in accordance with an exemplary embodiment of the present invention.

Referring now to FIGS. 3-5, an exemplary embodiment using the touchpad 130 is shown. The touchpad 130 may use a similar positioning of the fastener 260 within a boss 250 in the pantograph opening 280 as described previously with respect to FIGS. 2A and 2B. The touchpad 130 may include a tactile sensing layer 140, a capacitance or conductance layer 310, a printed circuit board (PCB) layer 320, and a pantograph plate layer 330 housing one or more pantographs 210. In some embodiments, the touchpad 130 may include detection of a user depressing the tactile sensing layer 140 to invoke predetermined functions, for example, by sensing the depression of the pantograph 210. In some embodiments, pressing the buttons 135 (FIG. 1) may invoke functions. The pantographs 210 may have exposed openings 280 or the openings 280 may be covered by the rubber domes 290. Whether the openings 280 are covered or not, the fastener 260 may fasten the bottom chassis 150 to the boss 250 while fitting inside the opening 280 with sufficient clearance so that the overlying layers 140 and 310 (or the rubber dome 290 when present) may not make contact with the fastener end 265. As may be appreciated, a fastener 260 may not be typically used underneath the tactile sensing layer 140 because of the risk of damage. However, by positioning the boss 250 within the previously existing opening 280, the fastener 260 may be used without damaging the touchpad 130.

It should be understood, of course, that the foregoing relate to exemplary embodiments of the invention and that modifications may be made without departing from the spirit and scope of the invention as set forth in the following claims.

We claim:

1. A computer input assembly, comprising:
    a top chassis;
    a depressible input mechanism interfacing the top chassis;
    a support member;
    a bottom chassis;
    a pantograph disposed between the input mechanism and the support member, the pantograph including a pair of scissor arms and an opening between the scissor arms; and
    a boss connected to the support member, the boss accessible through the bottom chassis and axially aligned to the opening between the scissor arms of the pantograph, the boss having an aperture passing through the boss, from a boss first side facing the bottom chassis to a boss second side facing the input mechanism, and a fastener to fasten the bottom chassis to the boss, the fastener located within the aperture such that a top end of the fastener fits within the opening between the scissor arms, the boss is positioned to provide clearance between the bottom side of the key and the fastener while the key is depressed.

2. The computer input assembly of claim 1, wherein the input mechanism is a keyboard key surrounding the pantograph.

3. The computer input assembly of claim 2, wherein the key is selected from one of a spacebar, a "Shift" key, an "Enter", and a "Backspace" type key.

4. The computer input assembly of claim 1, further comprising a rubber dome disposed over the pantograph and under the input mechanism, wherein the boss is configured to provide clearance between a bottom side of the rubber dome and the fastener while the input mechanism is depressed.

5. A touchpad assembly, comprising:
    a tactile sensing layer;
    a depressible input mechanism coupled to the tactile sensing layer;
    a support member disposed below the tactile sensing layer and the depressible input mechanism;
    a bottom chassis;
    a pantograph disposed between the input mechanism and the support member, the pantograph including an opening in a center of the pantograph; and
    a boss connected to the support member, the boss accessible through the bottom chassis and axially aligned to the opening of the pantograph, the boss having an aperture passing through the boss, from a boss first side facing the bottom chassis to a boss second side facing the input mechanism, and a fastener to fasten the bottom chassis to boss, the aperture receiving the fastener, the fastener located within the aperture such that a top end of the fastener fits within the opening between the scissor arms, wherein the input mechanism does not make contact with the fastener while the input mechanism is depressed onto the pantograph.

6. The touchpad assembly of claim 5, wherein the depressible input mechanism is disposed under the tactile sensing layer.

7. The touchpad assembly of claim 5, wherein the depressible input mechanism is a button disposed adjacent the tactile sensing layer and exposed for contact by a user.

8. The touchpad assembly of claim 5, further comprising a rubber dome disposed over the pantograph and under the tactile sensing layer, wherein the boss is configured to provide clearance between a bottom side of the rubber dome and the fastener while the input mechanism is depressed.

9. A keyboard assembly, comprising:
    a top chassis;
    a support plate;
    a bottom chassis;
    a keyboard exposed through the top chassis;
    a touchpad exposed through the top chassis;
    at least one pantograph disposed between either a key of the keyboard and the support plate or the touchpad and the support plate, the pantograph including a pair of scissor arms and an opening between the scissor arms; and
    a boss connected to the support plate, the boss accessible through the bottom chassis and axially aligned to the opening between the scissor arms of the pantograph, the boss fitting within the opening between the scissor arms while the pantograph is depressed, the boss having an aperture passing through the boss, from a boss first side facing the bottom chassis to a boss second side facing the key or touchpad, and a fastener to fasten the bottom chassis to the boss, the fastener located within the aperture such that a top end of the fastener fits within the opening between the scissor arms with clearance to a bottom side of the key or touchpad such that the key or the touchpad does not make contact with the fastener while the key or the touchpad is depressed onto the pantograph.

10. The keyboard assembly of claim 9, wherein the boss includes a top end disposed below the opening and the fastener projects into the opening while the pantograph is not depressed.

* * * * *